United States Patent
Gutman et al.

(10) Patent No.: US 7,909,175 B2
(45) Date of Patent: Mar. 22, 2011

(54) FILTER ASSEMBLIES

(75) Inventors: Richard Guy Gutman, Chichester (GB); Kenneth Roy Weight, Denmead (GB); George Brandwood Peacock, Chichester (GB); Nicholas Lloyd Yoward, Emsworth (GB); Michael Ernest Grimes, Hayling Island (GB)

(73) Assignee: Pall Corporation, Port Washington, NY (US)

( * ) Notice: Subject to any disclaimer, the term of this patent is extended or adjusted under 35 U.S.C. 154(b) by 551 days.

(21) Appl. No.: 10/498,378

(22) PCT Filed: Dec. 10, 2002

(86) PCT No.: PCT/GB02/05574
§ 371 (c)(1),
(2), (4) Date: Apr. 21, 2005

(87) PCT Pub. No.: WO03/053538
PCT Pub. Date: Jul. 3, 2003

(65) Prior Publication Data
US 2005/0173328 A1  Aug. 11, 2005

(30) Foreign Application Priority Data
Dec. 13, 2001  (GB) .................................. 0129837.1

(51) Int. Cl.
*B01D 27/00* (2006.01)
*B01D 35/00* (2006.01)
*B01D 29/00* (2006.01)

(52) U.S. Cl. ..................... 210/450; 210/455; 210/493.2; 210/435; 210/437; 210/444

(58) Field of Classification Search .................. 210/232, 210/455, 435, 450, 167.01
See application file for complete search history.

(56) References Cited

U.S. PATENT DOCUMENTS

| 3,850,813 | A | * | 11/1974 | Pall et al. | ...................... 210/232 |
| 5,024,761 | A | * | 6/1991 | Deibel | ........................... 210/232 |
| 5,116,499 | A | * | 5/1992 | Deibel | ........................... 210/232 |

(Continued)

FOREIGN PATENT DOCUMENTS
EP        0 702 144 A2    3/1996
(Continued)

OTHER PUBLICATIONS

Search Report for Application No. GB 0129837.1, which is the United Kingdom cognate of U.S. Appl. No. 10/498,378; Date: May 20, 2002.

*Primary Examiner* — Krishnan S Menon
*Assistant Examiner* — Benjamin Kurtz
(74) *Attorney, Agent, or Firm* — Leydig, Voit & Mayer, Ltd.

(57) ABSTRACT

A filter assembly comprises a filter (10) defining path for fluid passing to or from the filter (10). An adaptor (11) is connected to the filter (10) and provides a continuation of the path. The adaptor (11) is for mounting the filter (10) on a mounting plate (12) and carries one or more sealing rings (30, 37) that are engageable with the mounting plate (12). The adaptor (11) is made from a plastics material and one surface of the adaptor (11) is reinforced by contact with an annular reinforcing member (31) which may be of metal, particularly steel. This allows the flow path provided by the adaptor (11) to be maximized.

20 Claims, 1 Drawing Sheet

U.S. PATENT DOCUMENTS

| | | | | |
|---|---|---|---|---|
| 5,118,417 A | * | 6/1992 | Deibel | 210/232 |
| 5,238,717 A | * | 8/1993 | Boylan | 428/35.7 |
| 5,290,457 A | * | 3/1994 | Karbachsch et al. | 210/792 |
| 5,580,447 A | * | 12/1996 | Platter et al. | 210/206 |
| 6,085,915 A | * | 7/2000 | Schwandt et al. | 210/411 |

FOREIGN PATENT DOCUMENTS

| | | |
|---|---|---|
| GB | 2 056 307 A | 3/1981 |
| GB | 2 079 169 A | 1/1982 |
| GB | 2 287 659 A | 9/1995 |
| JP | 5-80509 U | 11/1993 |

* cited by examiner

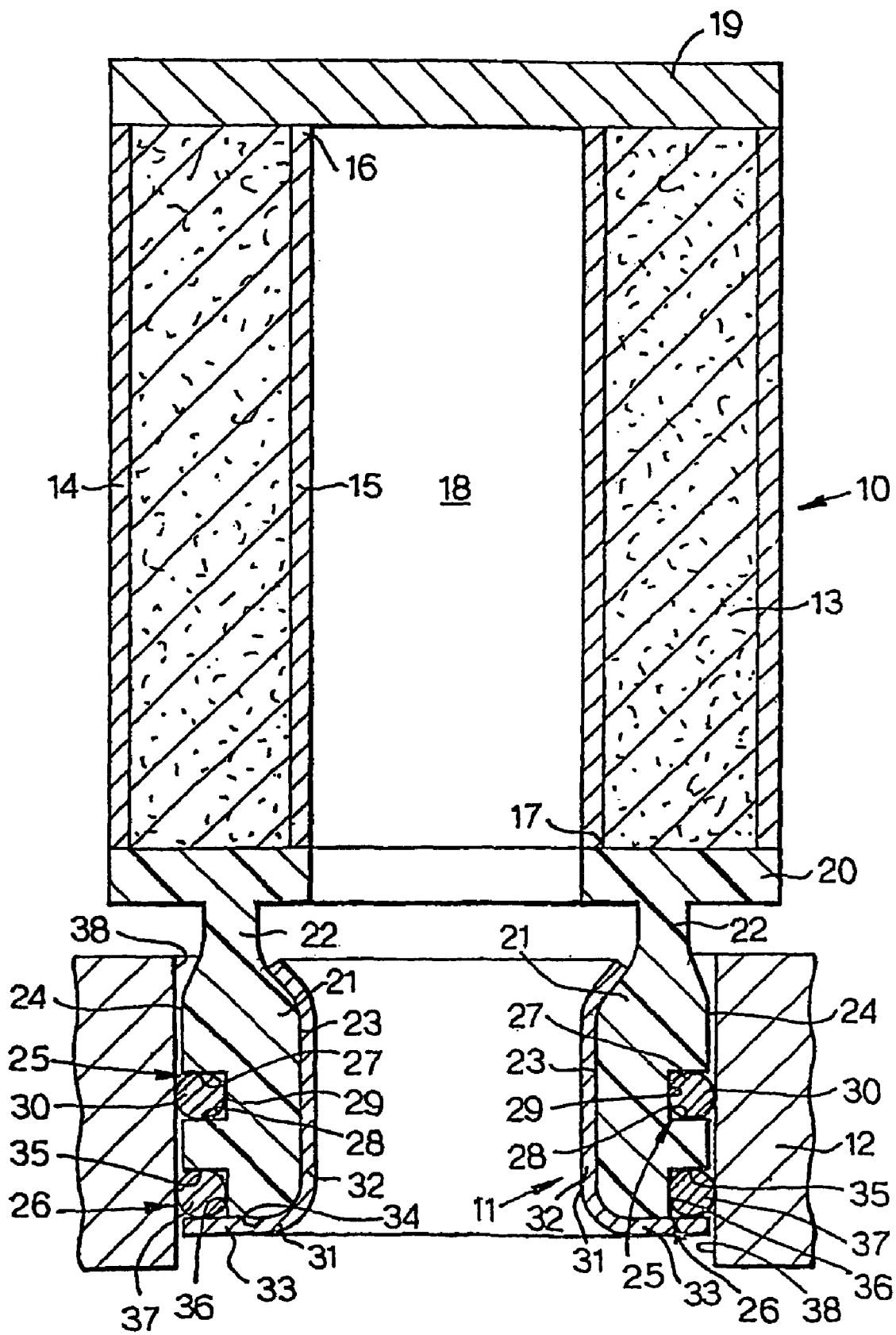

FILTER ASSEMBLIES

The invention relates to filter assemblies and to adaptors for mounting a filter in a filter assembly.

One form of adaptor is used with a filter of the kind defining a path for fluid passing to or from the filter. The adaptor includes an annular body which provides a continuation of said path and which is used for mounting the filter on, for example, a mounting plate. Such adaptors are normally made from a plastics material and in order to provide them with sufficient strength, the adaptor needs a required thickness. This limits the diameter of the path defined by the adaptor and this may reduce flow through the filter disadvantageously.

According to a first aspect of the invention, there is provided an adaptor for mounting a filter comprising an annular body and a connector for connecting the adaptor to a filter, the annular body including radially inner and outer surfaces, one surface being formed with a groove for receiving a sealing ring, an annular reinforcing member reinforcing the other surface and an annular portion of said groove.

The use of an annular reinforcing member at the surface allows the thickness of the adaptor to be reduced and so maximizes the flow path.

According to a second aspect of the invention, there is provided a filter assembly comprising a filter defining a path for fluid passing to or from the filter, an adaptor according to the first aspect of the invention being connected to said filter by said connector and providing a continuation of said path.

The following is a more detailed description of an embodiment of the invention, by way of example, reference being made to the accompanying drawing which is a schematic cross-sectional view of a filter assembly including a filter and an adaptor with the filter assembly being mounted on a mounting plate.

Referring to the drawing, the filter assembly comprises a filter 10, and an adaptor 11 which together are carried by a mounting plate 12. The filter 10 may be one of a plurality of filters carried by the mounting plate 12.

The filter 10 includes a filter material 13 which may be of pleated membrane material or may be a depth filter material or any other suitable form of filter material. The filter material 13 is provided with an upstream drainage layer 14 and a downstream drainage layer 15. The filter 10 has a first annular end 16 and a second annular end 17 and defines a central cylindrical passage 18 which provides a path for fluid to or from the filter material 13.

The first end 16 of the filter 10 is closed by a first end cap 19 which also closes the passage 18. The second end 17 of the filter 10 is closed by a second annular end cap 20 which leaves the passage 18 open. The first and second end caps 19,20 may be formed from a plastics material. They may be connected to the remainder of the filter 10 by gluing or welding or any other suitable process.

The adaptor 11 comprises an annular body 21 formed from a plastics material and provided at one end with an annular connector 22 which connects the annular body 21 to the second end cap 20. The annular body includes an annular inner surface 23 and an annular outer surface 24. The outer surface 24 is formed with first and second grooves 25,26. The first groove 25 is generally U-shaped and is formed from the material of the annular body 21 with first and second side walls 27,28 interconnected by a base 29. The first groove 25 contains a first sealing ring 30 of an elastomeric material.

The second groove 26 is formed by the annular body 21 and an annular reinforcing ring 31 of generally L-shaped cross-section. The reinforcing ring 31, which may be of a metal such as steel, has an axially extending portion 32 that overlies and contacts the inner surface 23 of the inner body 21 and a radially extending portion 33 that extends across an end wall 34 of the annular body 21. The reinforcing ring 31 is thus located on the inner surface 23 so that the reinforcing ring 31 reinforces the inner surface 23 and the annular body 21 particularly against forces acting on the annular body in a radial direction. The second groove 26 has a first side wall 35 formed in the annular body and a base 36 extending from the first side wall 35 to the end wall 34. The outer end of the radially extending portion 33 of the reinforcing ring 31 extends beyond the end wall 34 to form the second side wall of the second groove 26. The second groove 26 contains a second sealing ring 37 of an elastomeric material.

The advantage of forming the second groove 26 in this way is as follows.

The annular body 21 is formed by moulding. In order to mould the first groove 25, it is necessary to use split mould tools. Where these tools meet at the base 29 of the first groove 25, there will be a raised split line. This split line can lift the associated sealing ring 30 and provide a leakage path past the annular body 21. This can be overcome by forming the first groove 25 by machining rather than moulding or by forming the annular body from two or more parts, but these solutions are time consuming and expensive. The second groove 26 can be moulded without the use of a split tool because the first side wall 35 and the base 36 open on to the end wall 34 of the annular body 21. Accordingly, there is no possibility of a raised rib and thus the second sealing ring 37 will bear reliably against the base 36 and the first side wall 35 so preventing the possibility of a leakage path. Thus, although there might be a leakage path through the first group 25 caused by a rib, there will not be such a leakage path through the second groove 26.

The adaptor 11 is used to mount the filter 10 in a mounting plate 12 which is formed with a plurality of cylindrical apertures one of which is shown at 38. The aperture 38 is sized so that the outer surface 24 of the adaptor 11 is a close fit in the aperture 38, as seen in the FIGURE. In this position; the first and second sealing rings 30,37 seal against the aperture 38 to prevent the passage of fluid therebetween.

In use, fluid to be filtered passes from the radially outer surface of the filter 10 through the filter material 13 to the passage 18 after which it passes through the annular body 21 of the adaptor 11 which forms a continuation of the passage 18. Of course, the flow could be in the opposite direction.

The presence of the reinforcing ring 31 strengthens the adaptor particularly against forces acting in a radial direction and allows the thickness of the annular body 21 to be a minimum so allowing the diameter of the inner surface 23 of the annular body 21 to be a maximum. This in turn ensures that the adaptor 11 provides a minimum constriction on the flow of fluid from the filter 10. It also reduces the flexibility of the adaptor so ensuring that the first and second sealing rings 30,37 are reliably engaged with the aperture 38 in the mounting plate 12.

It will be appreciated that the adaptor 11 may be used with filters other than the filters of the kind described above. There need not be two sealing rings; there could be one sealing ring or three sealing rings or more sealing rings. Although the reinforcing ring 31 is described above as being made of metal; it could be made of any suitably stiff material.

Although the sealing rings 30,37 are shown on the outer surface 24 and the reinforcing ring 31 is shown as engaging the inner surface 23, the positions could be reversed with the sealing rings 30,37 being on the inner surface 23 and the reinforcing ring 31 on the outer surface 24. In this case, the mounting plate 12 would be replaced by a tube (not shown).

The invention claimed is:

1. An adaptor for mounting a filter comprising an annular body formed from a first material and also comprising a connector for connecting the adaptor to a filter, the annular body including radially inner and outer surfaces and further comprising an annular reinforcing member reinforcing one of the inner and outer surfaces of the annular body, the reinforcing member being formed from a second material different from the first material and comprising a first portion overlying the one surface of the annular body and a radially extending flange, wherein the annular body and the reinforcing member form a groove in the other of the inner and outer surfaces of the annular body for receiving a sealing ring, the groove being U-shaped with parallel first and second side walls and a base between the side walls, said first side wall being formed by the first material of said annular body and said second side wall being formed by the second material of said radially extending flange of the reinforcing member.

2. An adaptor according to claim 1 wherein said inner and outer surfaces are cylindrical surfaces co-axial with the axis of the annular body.

3. An adaptor according to claim 1 wherein the groove is formed on the radially outer surface.

4. An adaptor according to claim 1 wherein the adaptor includes an end wall extending between said inner surface and said outer surface, the base of the groove extending from said end wall and the reinforcing member projecting beyond said end wall to form said second side wall.

5. An adaptor according to claim 1 including at least one further groove.

6. An adaptor according to claim 1 wherein the groove contains an associated sealing ring.

7. An adaptor according to claim 1 wherein the annular body including the inner and outer surfaces is formed in one part from a plastics material.

8. An adaptor according to claim 1 wherein the reinforcing member comprises a metal.

9. A filter assembly comprising a filter defining a path for fluid passing to or from the filter, an adaptor according to claim 1 being connected to said filter by said connector and providing a continuation of said path.

10. A filter assembly according to claim 9 wherein the filter is annular with first and second ends, the adaptor being connected to one of said ends.

11. A filter assembly according to claim 10 wherein said one of said ends is closed by an end cap, the adaptor being connected to said end cap.

12. A filter assembly according to claim 9 further including a mounting plate having an aperture, the groove including a sealing ring sealingly engaging said mounting plate at said aperture.

13. A filter assembly according to claim 12 wherein the groove is formed on the radially outer surface of the annular body and wherein the aperture comprises an annular passage having an annular inner surface, the sealing ring sealingly engaging said inner surface.

14. An adapter for mounting a filter comprising an annular body, a connector for connecting the adapter to a filter, and a reinforcing member, wherein the annular body is formed from a first material and includes radially inner and outer surfaces, wherein the reinforcing member is formed from a second material different from the first material, the reinforcing member including a first portion and a second radially extending portion, the first portion being arranged along one of the inner and outer surfaces of the annular body to reinforce the annular body against forces acting on the annular body in a radial direction, and wherein the annular body and the reinforcing member form a groove in the other of the inner and outer surfaces of the annular body for receiving a sealing ring, the groove being generally U-shaped and having first and second parallel side walls and a base between the side walls, the first side wall of the groove being formed from the first material of the annular body and the second side wall of the groove being formed from the second material of the radially extending portion of the reinforcing member.

15. An adapter according to claim 14 wherein the first material comprises a plastic material.

16. An adapter according to claim 15 wherein the second material comprises a metallic material.

17. An adapter according to claim 14 wherein the reinforcing material contacts the annular body along one of the inner and outer surfaces of the annular body.

18. An adapter according to claim 14 wherein the radially extending portion of the reinforcing member extends along an end of the annular body.

19. An adapter according to claim 15 wherein the annular body including the inner and outer surfaces is formed in one part.

20. An adapter for mounting a filter and comprising an annular body, a connector which connects the annular body to a filter, and a reinforcing member which reinforces the annular body, wherein the annular body has first and second surfaces, one of the first and second surfaces being a radially inner surface and the other of the first and second surfaces being a radially outer surface, the annular body being formed in one part from a first material including a plastics material, wherein the reinforcing member is formed from a second material different from the first material and includes a first portion overlying the first surface of the annular body and a radially extending flange, wherein the second surface of the annular body has a first groove for receiving a sealing ring and including first and second side walls interconnected by a base, the first and second side walls and the base being formed in the one part annular body, wherein the annular body and the reinforcing member form a second groove in the second surface of the annular body for receiving a sealing ring, the second groove having first and second side walls and a base between the side walls, and wherein the first side wall of the second groove is formed in the one part annular body by the first material of the annular body and the second side wall of the second groove is formed by the second material of the radially extending flange of the reinforcing member.

* * * * *